(12) United States Patent
Perkins

(10) Patent No.: US 10,772,408 B2
(45) Date of Patent: Sep. 15, 2020

(54) KIT FOR EMITTING LIGHT ON A NAIL OF A USER AND ASSOCIATED METHOD

(71) Applicant: L'OREAL, Paris (FR)

(72) Inventor: Steven Perkins, Aulnay sous Bois (FR)

(73) Assignee: L'OREAL, Paris (FR)

( * ) Notice: Subject to any disclaimer, the term of this patent is extended or adjusted under 35 U.S.C. 154(b) by 464 days.

(21) Appl. No.: 15/527,074

(22) PCT Filed: Nov. 18, 2015

(86) PCT No.: PCT/EP2015/076926
§ 371 (c)(1),
(2) Date: May 16, 2017

(87) PCT Pub. No.: WO2016/079165
PCT Pub. Date: May 26, 2016

(65) Prior Publication Data
US 2017/0354227 A1    Dec. 14, 2017

(30) Foreign Application Priority Data

Nov. 18, 2014 (EP) ..................... 14306829

(51) Int. Cl.
| | |
|---|---|
| *A45D 31/00* | (2006.01) |
| *F21V 9/30* | (2018.01) |
| *F21V 33/00* | (2006.01) |
| *F21V 8/00* | (2006.01) |
| *F21Y 115/10* | (2016.01) |

(52) U.S. Cl.
CPC ............... *A45D 31/00* (2013.01); *F21V 9/30* (2018.02); *F21V 33/0004* (2013.01); *G02B 6/004* (2013.01); *G02B 6/0035* (2013.01); *G02B 6/0065* (2013.01); *G02B 6/0073* (2013.01); *F21Y 2115/10* (2016.08)

(58) Field of Classification Search
CPC ........ A45D 29/00; A45D 31/00; A45D 29/18; G02B 5/208; G02B 27/0172; G02B 27/026; G02B 6/001
See application file for complete search history.

(56) References Cited

U.S. PATENT DOCUMENTS

| | | | |
|---|---|---|---|
| 9,148,931 B2 * | 9/2015 | Valenti | .................. H05B 37/02 |
| 2007/0181142 A1 | 8/2007 | Tufts et al. | |

(Continued)

FOREIGN PATENT DOCUMENTS

| | | |
|---|---|---|
| JP | 2002042525 A | 2/2002 |
| JP | 2006073202 A | 3/2006 |

(Continued)

*Primary Examiner* — David P Porta
*Assistant Examiner* — Fani Boosalis
(74) *Attorney, Agent, or Firm* — Polsinelli PC

(57) ABSTRACT

A kit (10) for emitting light on a nail of a user, comprises: a light emitting diode (14) emitting light at a wavelength, a waveguide (26) coupled to the light emitting diode (14), and a fixing element for fixing the waveguide (26) on the nail of the user.
The kit (10) comprises at least one fluorescent coating (30) intended to be applied on the waveguide (26), the waveguide (26) being configured to transmit the light emitted by the light emitting diode (14) to the fluorescent coating (30), the fluorescent coating (30) being excited at the wavelength of the light emitting diode (14).

20 Claims, 1 Drawing Sheet

(56) References Cited

U.S. PATENT DOCUMENTS

| | | | |
|---|---|---|---|
| 2009/0012515 A1* | 1/2009 | Hoenig | A61B 18/203 606/33 |
| 2009/0293896 A1* | 12/2009 | Simpson | A45D 31/00 132/73 |
| 2010/0008876 A1* | 1/2010 | Tanaka | A45D 31/00 424/61 |
| 2014/0049983 A1* | 2/2014 | Nichol | G02B 6/0018 362/610 |
| 2014/0102469 A1* | 4/2014 | Loudon | A61Q 5/12 132/208 |

FOREIGN PATENT DOCUMENTS

| | | | |
|---|---|---|---|
| JP | 2008140698 A | 6/2008 | |
| JP | 2009268893 A | 11/2009 | |
| JP | 2012082135 A | 4/2012 | |
| KR | 2014-0039533 A | 4/2014 | |

* cited by examiner

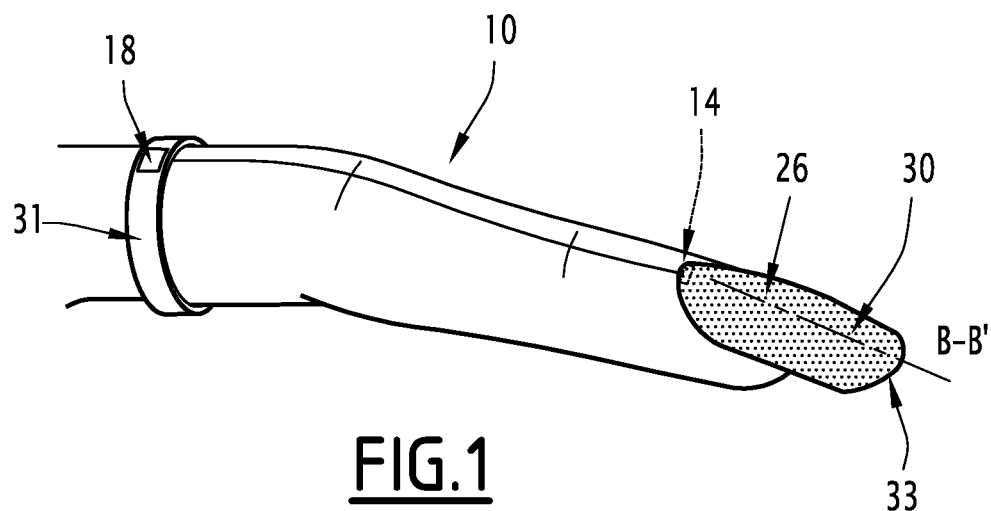
FIG.1
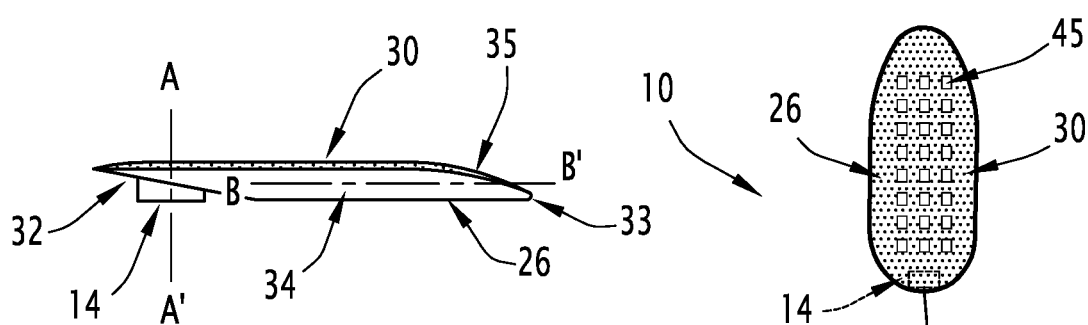
FIG.2
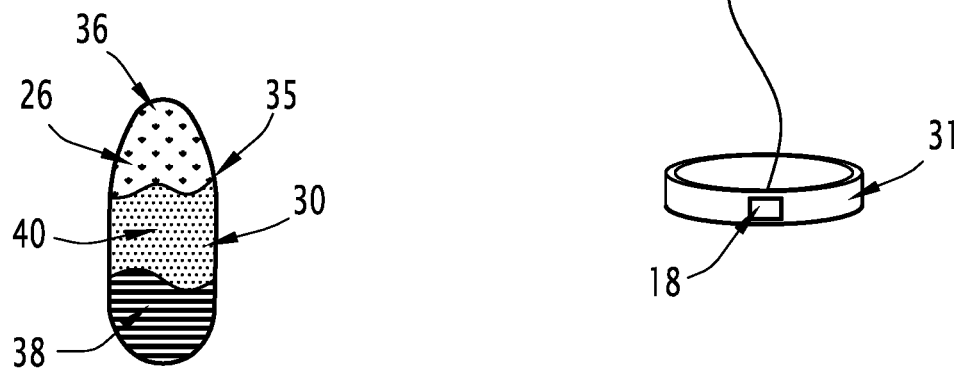
FIG.3
FIG.4

KIT FOR EMITTING LIGHT ON A NAIL OF A USER AND ASSOCIATED METHOD

CROSS REFERENCE TO RELATED APPLICATIONS

This application is a National Phase filing under 35 U.S.C. § 371 of PCT/EP2015/076926 filed on Nov. 18, 2015; and this application claims priority to Application No. 14306829.4 filed in Europe on Nov. 18, 2014 under 35 U.S.C. § 119. The entire contents of each application are hereby incorporated by reference.

BACKGROUND OF THE INVENTION

Technical Field

This invention relates to a kit for emitting light on a nail of a user, comprising:
 a light emitting diode emitting light at a wavelength,
 a waveguide coupled to the light emitting diode, and
 a fixing element for fixing the waveguide on the nail of the user.

The kit is intended to be fixed on a nail of a user in order to emit light on the nail of the user.

BACKGROUND ART

Brief Summary Of The Invention

It is known from the prior art, a device, called NailDisplay, capable to display images on an OLED (abbreviation of Organic Light-Emitting Diode) screen that is placed over a nail of a user.

However, such a device is far from practical and requires bulky electronics and a complex driving circuitry to run.

WO 2013/168909 describes a battery free transparent body incorporating two small light emitting diodes. The transparent body is illuminated with a light coming from the light emitting diodes.

However, the light at the output of the transparent body is not very bright and does not illuminate the entire transparent body. Moreover, the transparent body is illuminated with a light having a single color. To change the color of the light, a new transparent body is required each time.

An objective of the invention is to obtain a kit for emitting light on a nail of a user which is more convenient to use and which is capable of illuminating the whole surface of the nail of the user in a customized manner.

To this end, the invention relates to a kit for emitting light on a nail of a user of the type mentioned above wherein the kit comprises at least one fluorescent coating intended to be applied on the waveguide, the waveguide being configured to transmit the light emitted by the light emitting diode to the fluorescent coating, the fluorescent coating being excited at the wavelength of the light emitting diode.

The kit according to the invention may include one or more of the following features, considered alone or in any combination that is technically possible:
 the light emitting diode is a microled;
 the light emitting diode has a diameter inferior to 30 μm, preferably inferior to 20 μm and advantageously equal to 15 μm;
 the wavelength of the light emitted by the light emitting diode is comprised in a range between 315 nm and 420 nm and advantageously in a range between 400 nm and 410 nm;
 an end of the waveguide is coupled to the light emitting diode, the end of the waveguide being beveled;
 the beveled end of the waveguide is beveled by an angle lower than 90°, preferably lower than 60° and advantageously comprised between 30° and 60°;
 the waveguide is made of a flexible and transparent material, in particular polydimethylsiloxane;
 one surface of the waveguide comprises embossings and/or printings capable of scattering the light passing through the waveguide;
 the fluorescent coating is applied on a surface of the waveguide, the fluorescent coating being advantageously removable;
 the fluorescent coating comprises at least one fluorophore, the light emitted by each excited fluorophore having a wavelength in the visible range;
 the fluorescent coating comprises at least a first fluorophore and a second fluorophore emitting light at different wavelengths ;
 the kit comprises a power supply device for supplying the light emitting diode, the power supply device being a battery or an inductive power source; and
 the kit comprises a ring to be placed around a finger of a user, the power supply device being carried by the ring and being connected to the light emitting diode.

The invention also relates to a method for emitting light on a nail of a user, comprising the steps of:
 providing a kit as described above,
 fixing the waveguide on the nail of the user,
 applying the fluorescent coating on the waveguide,
 powering the light emitting diode and transmitting the light emitted by the light emitting diode with the waveguide, and
 exciting the fluorescent coating with the light transmitted with the waveguide (26).

The method according to the invention may comprise the step of removing the fluorescent coating, and advantageously of applying another fluorescent coating.

BRIEF DESCRIPTION OF THE SEVERAL VIEWS OF THE DRAWINGS

The invention will be easier to understand in view of the following description, provided solely as an example and with reference to the appended drawings in which:

FIG. 1 is a schematic representation of a kit according to the invention, the kit being placed on a finger of a user, FIG. 2 is a side view of a waveguide of the kit of FIG. 1, FIG. 3 is an upper view of a waveguide of a kit according to another embodiment of the invention, the waveguide being covered with different fluorescent coatings, and FIG. 4 is a schematic representation of another embodiment of a kit according to the invention.

DETAILED DESCRIPTION OF THE INVENTION

A kit 10 for emitting light on a nail of a user, according to a first embodiment of the invention, is illustrated in FIG. 1.

The kit 10 is intended to emit light on the nail of a user with a light whose wavelength is comprised in the visible range. It is understood by "visible range" for the wavelength, the range of wavelength from 380 nanometers (nm) to 780 nm.

As illustrated on FIG. 1, the kit 10 comprises a light emitting diode 14, a power supply device 18 for powering the light emitting diode 14 and a waveguide 26 for transmitting and guiding the light emitted by the light emitting diode 14. The kit 10 further comprises a fixing element for fixing the light emitting diode 14 and the waveguide 26 on a nail of a user and at least one fluorescent coating 30.

The light emitting diode 14 is an opto-electronic component capable of emitting light when it is activated by an electric current.

The kit 10 comprises one or more light emitting diode(s) 14 depending on the required brightness and on the power consumption of each light emitting diode 14.

The light emitting diode 14 is capable to produce a light which is substantially monochromatic. It is understood by the term "substantially monochromatic light", a light whose wavelength range of emission is lower than 30 nm.

The wavelength $\lambda_l$ of the light produced by the light emitting diode 14 belongs to the visible range or the near ultraviolet range (abbreviated by UVA). It is understood by "near ultraviolet range" for the wavelength, the range of wavelength from 315 nm to 380 nm. In other words, the light emitted by the light emitting diode 14 has a wavelength $\lambda_l$ comprised between 315 nm and 780 nm. Preferably, the light emitted by the light emitting diode 14 has a wavelength $\lambda_l$ comprised between 400 nm and 410 nm. Advantageously, the light emitted by the light emitting diode 14 has a wavelength $\lambda_l$ equal to 405 nm.

Moreover, the light beam emitted by the light emitting diode 14 can be collimated over a given distance, for example, over 1 millimeter (mm). It is understood by "collimated" for a light beam, a light beam whose rays are parallel or within an angle opening of less than 30° over the given distance, for example, over 1 mm.

The light emitting diode 14 is a microled. It is understood by "microled", a light emitting diode that has a diameter of the order of magnitude of the micrometer (μm).

The diameter of the microled is inferior to 30 μm, preferably inferior to 20 μm and advantageously equal to 15 μm.

The microled requires very little power to operate. The maximum operating power of the microled is, advantageously, inferior to 5 milliwatts (mW). Such a low power allows the use of small batteries to power the microled.

The power supply device 18 is intended to power the light emitting diode 14.

As the light emitting diode 14 requires low power, the power supply device 18 is, preferably, a low power source, for example a source that delivers a power lower than 5 mW.

In the first embodiment of the invention, the kit comprises a ring 31, illustrated on FIG. 1, containing the power supply device 18. The ring 31 is configured to be positioned around a finger of the user. The power supply device 18 comprises an electric battery and is connected by a wire to the light emitting diode 14 as illustrated on this FIG. 1. In this embodiment, the light emitting diode 14 is directly supplied by an electric current coming from the electric battery of the power supply device 18.

The waveguide 26 is intended to transmit the light emitted by the light emitting diode 14 along the entire surface of the waveguide 26.

The waveguide 26 is coupled to the light emitting diode 14. In other words, the light beam coming from the light emitting diode 14 is directly injected into the waveguide 26. The light emitted by the light emitting diode 14 is sufficiently collimated to prevent losing substantial light when coupling the light emitting diode 14 to the waveguide 26.

The waveguide 26 is made of a body of flexible and transparent material. The body is, for example, made of polymer such as PDMS (polydimethylsiloxane).

The end of the waveguide 26 which is coupled to the light emitting diode 14 is beveled by an angle lower than 90°, preferably lower than 60° and advantageously comprised between 30° and 60° to form a bevel 32 (visible on FIG. 2). In particular, the end of the waveguide 26 is beveled by an angle equal to 45°.

The thickness of the waveguide 26, apart from its beveled end, is lower than 2 mm and is for example comprised between 0.5 mm and 1.5 mm.

The body is flexible so as to be reversibly deformable by a contact. For example, the body is reversibly deformable by pinching the sides of the body between the fingers of a user.

The body is transparent in the absence of fluorescent coating. This means that the nail of the user is visible through the body when the body is applied on the nail.

As illustrated on FIGS. 1 and 2, the body extends along a longitudinal axis B-B' and has a contour similar to the contour of a human nail. The body has two lateral sides and a rounded tip 33.

As illustrated on FIG. 2, the body has a lower surface 34 intended to be fixed on the nail and an upper surface 35 for receiving the fluorescent coating 30.

As illustrated on this FIG. 2, the bevel 32 is located opposite to the rounded tip 33 on the lower surface 34. The light emitting diode 14 is fixed against the bevel 32. The axis A-A' of light emission of each diode is advantageously perpendicular to the longitudinal axis B-B'.

Such a bevel 32 allows the coupling of the light coming from the light emitting diode 14 into the waveguide 26 without substantially losing light. The percentage of lost light is, indeed, lower than 5%.

The fixing element is intended to fix the light emitting diode 14 and the waveguide 26 to the nail of the user. The fixing element is, for example, an adhesive layer.

The fluorescent coating 30 is advantageously a cosmetic product such as a nail formula.

The fluorescent coating is configured to be excited at the wavelength $\lambda_l$ emitted by the light emitting diode 14.

In this embodiment, the fluorescent coating 30 comprises at least one fluorophore. It is understood by "fluorophore", a fluorescent chemical compound that can re-emit light upon light excitation.

Advantageously, the fluorescent coating 30 comprises a plurality of fluorophores.

Each fluorophore is capable of being excited at the wavelength $\lambda_l$ emitted by the light emitting diode 14. The light emitted by each fluorophore has a wavelength $\lambda_f$ in the visible range.

The fluorophores of the fluorescent coating 30 are either identical or different. When the fluorophores of the fluorescent coating 30 are identical, the excited fluorophores emit a light at a single wavelength $\lambda_f$. When some fluorophores of the fluorescent coating 30 are different, at least a first fluorophore and a second fluorophore emit a light at a different wavelength $\lambda_f$.

The fluorescent coating 30 is intended to be applied on the surface of the waveguide 26. The waveguide 26 is configured to transmit the light emitted by the light emitting diode 14 to the fluorescent coating 30.

The fluorescent coating 30 is configured to be removed from the surface of the waveguide 26 with a cosmetic solvent such as a nail polish removal.

The method for emitting light on a nail of a user according to the first embodiment of the invention will now be described.

Initially, the method comprises a step of providing a kit 10 as described above. The light emitting diode 14 is unpowered and the fluorescent coating 30 is not illuminated.

The ring 31 is placed around one finger of the user.

Then, the method comprises a step of fixing the light emitting diode 14 and the lower surface 34 of the waveguide 26 on the nail of the user with the fixing element.

The method further comprises a step of applying the fluorescent coating 30 on the upper surface 35 of the waveguide 26. As illustrated on FIGS. 1 and 2, the fluorescent coating 30 is for example applied on the whole upper surface 35 of the waveguide 26.

Then, the method comprises a step of powering the light emitting diode 14 thanks to the power supply device 18.

The method further comprises a step of transmitting the light emitted by the light emitting diode 14 to the fluorescent coating 30 through the waveguide 26. During this step, at least one fluorophore of the fluorescent coating 30 is excited by the light coming from the light emitting diode 14 at the wavelength $\lambda_l$.

Thereafter, each excited fluorophore emits a light at a wavelength $\lambda_f$ in the visible range.

Optionally, the method comprises a step of removing the fluorescent coating 30 thanks to the cosmetic product and a step of applying another fluorescent coating 30 on the surface of the waveguide 26.

Hence, the fluorescent coating 30 can be simply and easily removed by using a cosmetic product in order to create a new design on the surface of the waveguide 26. Therefore, the kit 10 can be used to create a huge number of patterns with a range of different colors. Such a kit 10 is therefore adaptable to the user and customizable.

According to a second embodiment of the invention, the elements identical to the kit 10 of the first embodiment of the invention are not described again. Only the differences are highlighted.

The kit 10 comprises several fluorescent coatings obtained from several cosmetic products. The colors obtained when exciting each fluorescent coating 30 are different from one fluorescent coating 30 to another, which means that at least a fluorophore of a first coating and at least a fluorophore of a second coating emit light at different wavelengths $\lambda_f$.

The method for emitting light on the nail of a user according to the second embodiment differs from the first embodiment in that different fluorescent coating 30 are applied on different regions of the upper surface 35 of the waveguide 26.

For example, as illustrated on FIG. 3, the upper surface 35 of the waveguide 26 is covered with three different fluorescent coatings 30: a first coating 36 applied at the rounded tip of the nail, a second coating 38 applied at the opposite of the rounded tip of the nail and a third coating 40 applied between the first coating 36 and the second coating 38.

Hence, the kit 10 is configured to emit light on a nail of a user with a wide range of color. Indeed, the range of colors available only depends on the different fluorescent coatings 30 applied on the waveguide 26. It is, therefore, possible to emit light on a nail of a user with a plurality of colors at the same time, depending only on the fluorescent coatings 30.

Moreover, there is no need to use different light emitting diode 14 emitting light at different wavelength $\lambda_l$ because the color of illumination only depends on the fluorophores contained in the fluorescent coating. A light emitting diode 14 emitting light at a wavelength $\lambda_l$ of about 405 nm is capable of exciting a large number of fluorophores.

Therefore, the kit 10 allows any colors to be produced in a simple way with a single kit 10 and without needing to embed several light emitting diodes 14 along the entire surface of the nail to be illuminated.

According to a third embodiment of the invention illustrated on FIG. 4, the elements identical to the kit 10 of the first embodiment of the invention are not described again. Only the differences are highlighted.

The upper surface 35 of the waveguide 26 comprises some embossings 45 and/or some printings. It is understood by "embossings" for a surface, a surface marked by relief patterns and/or protuberances, that is to say a surface that is not smooth.

The printings are, for example, some patterns created by a printing machine or by the user. The printings maintain the surface of the waveguide 26 smooth.

The method for emitting light on the nail of a user according to the third embodiment is identical to the method of the first embodiment.

As a consequence, the kit 10 allows emitting light on the nail of the user with different patterns thanks to the embossings 45 and to the printings that scatter the light passing through the waveguide 26.

According to a fourth embodiment of the invention, the kit 10 is identical to the second embodiment and comprises also the characteristics of the kit of the third embodiment of the invention.

In a variation of the previously described embodiments, the power supply device 18 is a film battery. It is understood by "film battery", a battery whose thickness is of the order of magnitude of the millimeter. A film battery comprises, for example, a lithium ion battery.

Advantageously, the film battery can be located on or under the light emitting diode 14.

The film battery is, for example, a SoftBattery® produced by the company Enfucell.

In another variant, the power supply device 18 comprises a bracelet configured to be positioned around the wrist of the user and for emitting a variable electromagnetic field.

The power supply device 18 further comprises an inductive power source for producing electric power when exposed to a variable electromagnetic field. The inductive power source is connected to the light emitting diode 14. For example, the inductive power source can be located on or under the light emitting diode 14. The inductive power source is, for example, a radio-frequency induction device, that is to say a device that uses a radio frequency magnetic field to transfer energy by means of electromagnetic induction in the near field.

The method for emitting light on the nail of a user according to this embodiment is identical to the method of the first embodiment.

The invention claimed is:

1. A kit for emitting light on a nail of a user, comprising:
   a light emitting diode emitting light at a wavelength ($\lambda_l$),
   a waveguide coupled to the light emitting diode,
   a fixing element for fixing the waveguide on the nail of the user,
      wherein the kit comprises at least one fluorescent coating intended to be applied on the waveguide, the waveguide being configured to transmit the light emitted by the light emitting diode to the fluorescent coating, the fluorescent coating being excited at the wavelength ($\lambda_l$) of the light emitting diode.

2. The kit according to claim 1, wherein the light emitting diode is a microled.

3. The kit according to claim 1, wherein the light emitting diode has a diameter less than 30 µm.

4. The kit according to claim 1, wherein the wavelength ($\lambda_l$) of the light emitted by the light emitting diode is in a range between 315 nm and 420 nm.

5. The kit according to claim 1, wherein an end of the waveguide is coupled to the light emitting diode, the end of the waveguide being beveled.

6. The kit according to claim 5, wherein the beveled end of the waveguide is beveled by an angle lower than 90°.

7. The kit according to claim 5, wherein the beveled end of the waveguide is beveled by an angle lower than 60°.

8. The kit according to claim 5, wherein the beveled end of the waveguide is beveled by an angle between 30° and 60°.

9. The kit according to claim 1, wherein the waveguide is made of a flexible and transparent material.

10. The kit according to claim 1, wherein one surface of the waveguide comprises embossings and/or printings capable of scattering the light passing through the waveguide.

11. The kit according to claim 1, wherein the fluorescent coating is applied on a surface of the waveguide, the fluorescent coating being removable.

12. The kit according to claim 1, wherein the fluorescent coating comprises at least one fluorophore, the light emitted by each excited fluorophore having a wavelength ($\lambda_f$) in the visible range.

13. The kit according to claim 12, wherein the fluorescent coating comprises at least a first fluorophore and a second fluorophore emitting light at different wavelengths ($\lambda_f$).

14. The kit according to claim 1, comprising a power supply device for supplying the light emitting diode, the power supply device being a battery or an inductive power source.

15. The kit according to claim 14, comprising a ring to be placed around a finger of a user, the power supply device being carried by the ring and being connected to the light emitting diode.

16. The kit according to claim 1, wherein the light emitting diode has a diameter less than 20 µm.

17. The kit according to claim 1, wherein the light emitting diode has a diameter equal to 15 µm.

18. The kit according to claim 1, wherein the wavelength ($\lambda_1$) of the light emitted by the light emitting diode is in a range between 400 nm and 410 nm.

19. A method for emitting light on a nail of a user comprising:
obtaining a kit according to claim 1,
fixing the waveguide on the nail of the user,
applying the fluorescent coating on the waveguide,
powering the light emitting diode and transmitting the light emitted by the light emitting diode with the waveguide, and
exciting the fluorescent coating with the light transmitted with the waveguide.

20. The method according to claim 19, further comprising removing the fluorescent coating, and applying another fluorescent coating.

* * * * *